United States Patent [19]
Haskin

[11] Patent Number: 5,790,910
[45] Date of Patent: Aug. 4, 1998

[54] CAMERA MOUNTING APPARATUS

[75] Inventor: Igor Haskin, Skokie, Ill.

[73] Assignee: Peerless Industries, Inc., Melrose Park, Ill.

[21] Appl. No.: 905,191

[22] Filed: Aug. 4, 1997

[51] Int. Cl.[6] ..................................... G03B 17/56
[52] U.S. Cl. ..................... 396/427; 396/428; 352/243; 248/181.1
[58] Field of Search .................. 396/419, 427, 396/428; 352/243; 348/143, 373; 248/181.1, 181.2, 182.1

[56] References Cited

U.S. PATENT DOCUMENTS

| | | |
|---|---|---|
| D. 307,915 | 5/1990 | Knester . |
| D. 340,940 | 11/1993 | Ellenberger . |
| 1,435,437 | 11/1922 | Taylor . |
| 2,497,804 | 2/1950 | Sterns . |
| 3,781,047 | 12/1973 | Surko . |
| 3,841,769 | 10/1974 | Bowerman . |
| 4,016,583 | 4/1977 | Yeates . |
| 4,157,876 | 6/1979 | DiGiulio . |
| 4,531,855 | 7/1985 | Wallis . |
| 4,613,251 | 9/1986 | Bellamy et al. . |
| 4,645,155 | 2/1987 | Eldon et al. . |
| 4,708,510 | 11/1987 | McConnell et al. . |
| 4,770,382 | 9/1988 | Lehti . |
| 4,986,503 | 1/1991 | Kabat . |
| 5,056,951 | 10/1991 | Mariani . |
| 5,224,675 | 7/1993 | Ellenberger et al. . |
| 5,251,859 | 10/1993 | Cyrell et al. . |
| 5,398,901 | 3/1995 | Brodmann et al. . |
| 5,505,415 | 4/1996 | Brett . |
| 5,544,968 | 8/1996 | Goellner . |
| 5,553,820 | 9/1996 | Karten et al. . |

*Primary Examiner*—A. A. Mathews
*Attorney, Agent, or Firm*—Lockwood, Alex, FitzGibbon & Cummings

[57] ABSTRACT

A mounting apparatus for a surveillance camera includes a base plate, a swivel assembly and an elongated housing interconnecting the two. The base plate and housing include wire openings formed therein that cooperate to define a wire pathway through the housing. The swivel assembly includes a ball and socket arrangement by which the position of the camera may be easily adjusted.

21 Claims, 3 Drawing Sheets

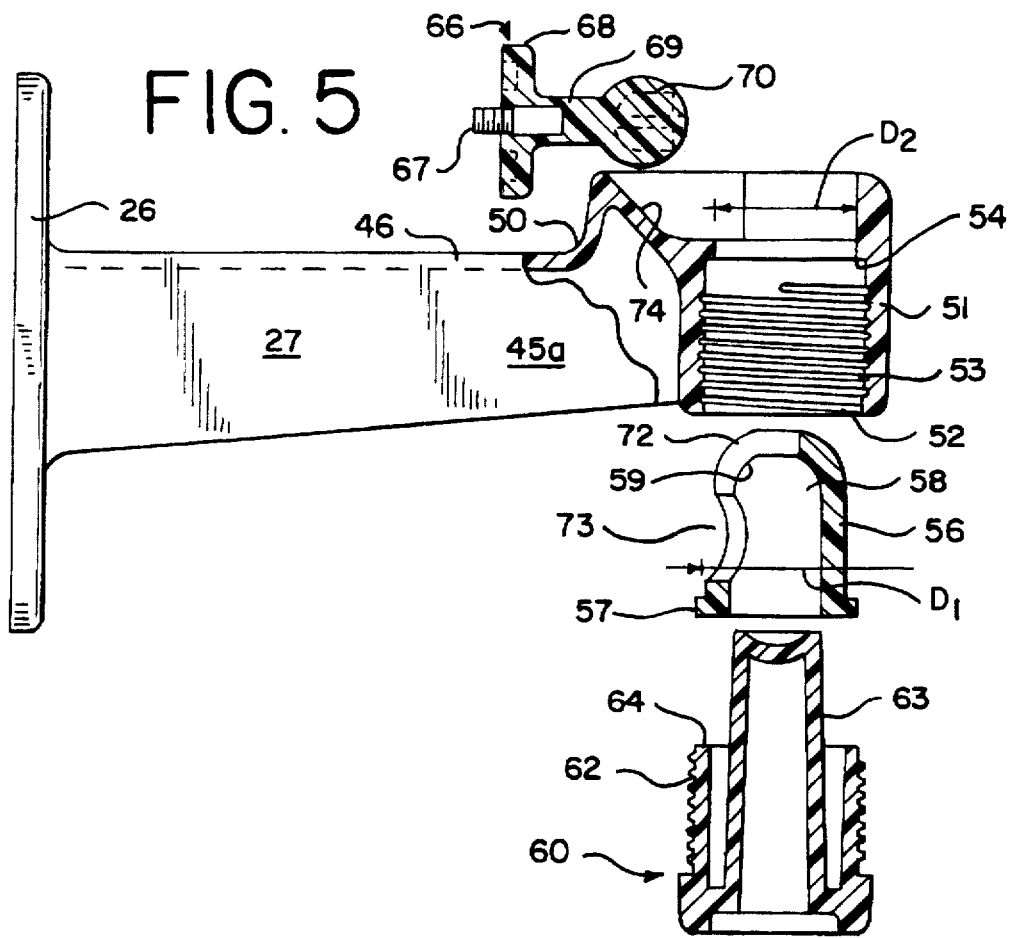
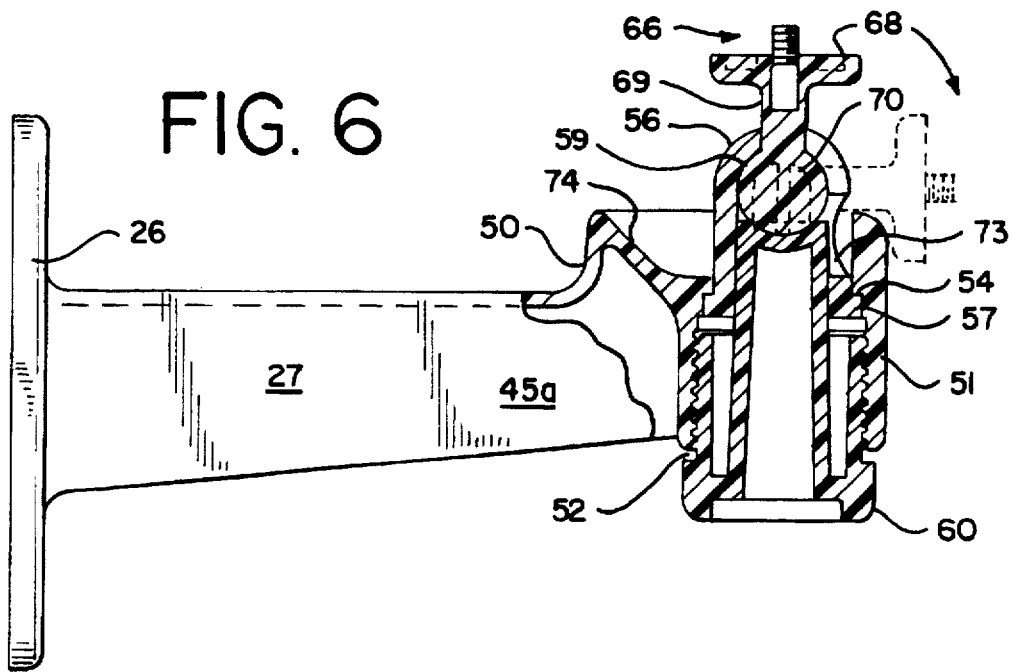

CAMERA MOUNTING APPARATUS

BACKGROUND OF THE INVENTION

The present invention relates generally to camera mounting apparatus and more specifically to a mounting arm for a security or other video camera.

Security and surveillance systems utilize cameras, typically video cameras, to provide surveillance of premises. These cameras are mounted to walls and other surfaces. The cameras may be either mounted in a manner that permits the controlled movement of the camera or that fixes the camera in place fixed upon one specific area of the premises.

Conventional mounting devices that are used for cameras with controlled movement require a complex combination of subcomponents that result in the camera mount being bulky with difficult to service, not to mention the large expense. Static mounting devices, which fix the camera in a specific position are not always easily adjustable nor do they permit mounting directly to an electrical junction box.

SUMMARY OF THE INVENTION

The present invention is therefor directed to a static mounting assembly that is easy to adjust once in place and is inexpensively constructed.

Another object of the present invention is to provide a camera mounting arm for mounting a security camera, such as a video camera, to a mounting surface in which the position of the camera relative to the mounting arm may be easily adjusted by a service man.

A further object of the present invention is to provide a camera mounting arm that is adapted for mounting directly to an electrical box and which has a wire pathway that facilitates attachment of the power and transmission wires of the camera to corresponding wires in the electrical box.

A still further object of the present invention is to provide a molded camera mounting apparatus having a base adapted for attachment to a mounting surface, a swivel mount adapted for mounting a camera, a hollow arm portion interconnecting the base with the swivel mount, the hollow arm portion having a wire pathway portion integrated therein and the swivel mount including a rotatable camera mounting screw, a socket which receives the mounting screw and a means for applying a functional face to the mounting screw to retain it in a specific position within the socket.

Yet still another object of the present invention is to provide a durable camera mounting apparatus of simplified design and having a minimum of parts, the apparatus including an elongated camera arm adapted for mounting to either an electrical box or a wall surface, a swivel assembly rotatably mounted in a free end of the arm. The swivel assembly including a socket member mounted for rotation in a bore of the arm, the socket including a camera engaging stud supported therein, the camera engaging stud having a ball end that is movably received within the socket and the swivel assembly further including a locking screw threadedly engaging the camera arm and movable into an out of contact with the ball stud to apply a locking force thereto.

These objects are achieved by providing a camera mounting assembly that, as exemplified by the preferred embodiment of the present invention, includes a base adapted for mounting on a surface, an arm housing extending out from the base and an adjustable swivel assembly disposed at the free end of the arm housing, wherein the base is adapted for mounting directly to an electrical box and the base has a wire opening formed therein that communicates with an interior portion of the arm housing to define a pathway for power and transmission wires of the camera to extend from the electrical box to the camera.

In another principal aspect of the present invention, the swivel assembly includes a camera mounting screw adapted to engage a camera housing and having a ball on a free end thereof, the ball being rotatably received within a socket rotatably mounted to the free end of the arm, the swivel assembly including an adjustable screw that applies a frictional retention force to both the ball and socket.

These and other objects, features and advantages of the present invention will become apparent from the following detailed description, taken in conjunction with the accompanying drawings, wherein like reference numerals refer to like parts.

BRIEF DESCRIPTION OF THE DRAWINGS

In the course of the following detailed description, reference will be frequently made to the accompanying drawings in which:

FIG. 5 is a side elevational view of the mounting assembly of FIG. 2, with the swivel assembly components detached from the mounting arm and shown in section; and, FIG. 6 is a side elevational view of the mounting assembly of FIG. 5 illustrating the swivel assembly components assembled to the free end of the mounting arm.

DETAILED DESCRIPTION OF THE PREFERRED EMBODIMENT

Figure 1:
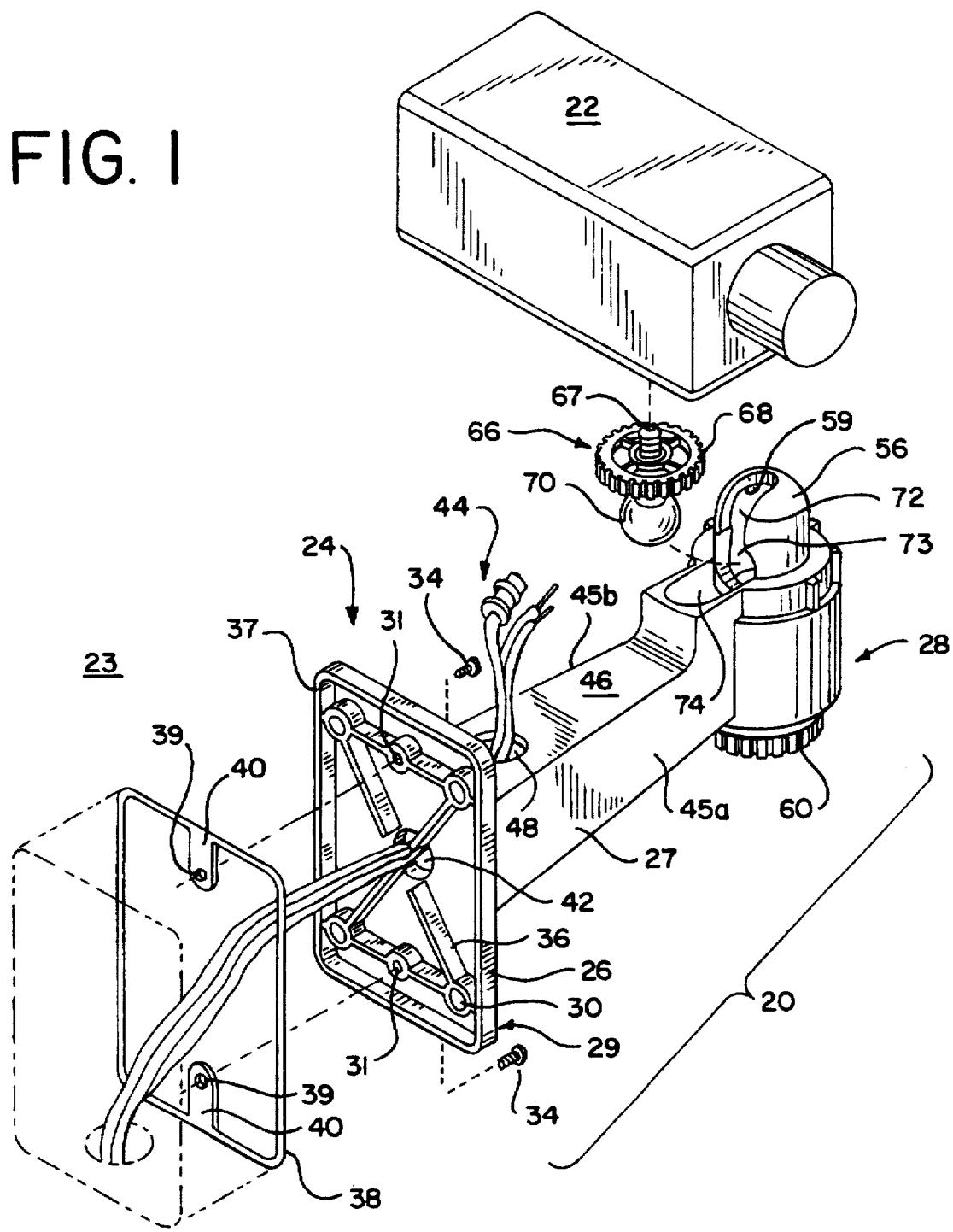
FIG. 1 is an exploded perspective view of a camera mounting assembly constructed in accordance with the principles of the present invention.

FIG. 1 illustrates a camera mounting apparatus 20 constructed in accordance with the principles of the present invention. The mounting apparatus 20 finds its greatest utility in the mounting of security or surveillance cameras 22 on wall or ceiling surfaces 23 or other planar mounting surfaces. The mounting apparatus 20 can be seen to include a base 24 in the form of a base plate member 26, an elongated arm 27 cantilevered out from the base 24 and a swivel assembly 28 to which the camera 22 is mounted. The swivel assembly 28 is adjustable so that a user may adjust both the horizontal ("pan") and the vertical ("tilt") orientation of the camera 22 on the mounting assembly 20 as well as lock the position of the camera 22 in place upon the apparatus 20.

Figure 2:
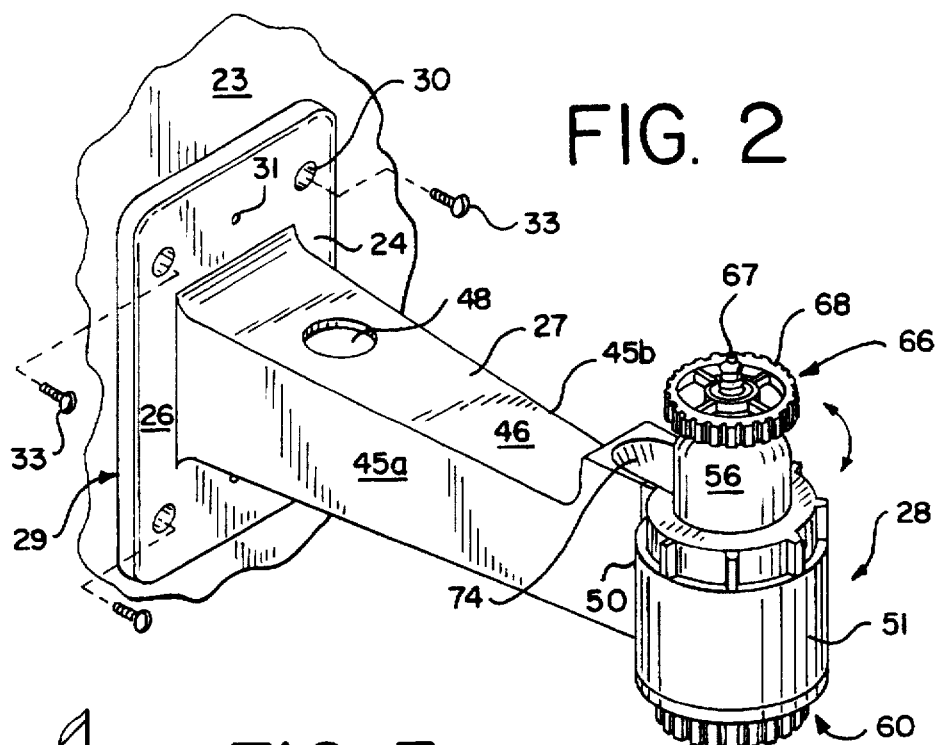
FIG. 2 is a perspective view of the mounting assembly of FIG. 1 in an assembled condition.

The base plate 26 preferably has a flat rear configuration that permits it to be flush-mounted on any flat mounting surface, such as the wall surface 23 illustrated. In this regard, and in an important aspect of the present invention, the base plate 26 may be provided with two distinct sets of mounting holes 30, 31 that are sized to receive one or more fasteners, such as screws 33, 34. One set of mounting holes 30 is dimensioned to receive conventional wall mounting screws 33 and are arranged in a pattern so as to fully support the entire weight of the mounting apparatus 20 and the camera 22 mounted thereto. Four such holes 30 are illustrated in FIGS. 1 & 2. The base plate 26 may include one or more stiffeners in the form of ribs 36 that surround the mounting holes 30 and which are interconnected to a skirt portion 37 that forms an exterior edge 29 of the mounting base plate 26. The ribs 36 strengthen the base plate 26 to resist structurally loading from the camera 22.

The base plate 26 also includes a second pair of mounting holes 31 that are positioned on the base plate 26 in a spacing that matches that of a conventional electrical box 38. These second mounting holes 31 receive machine screws 34 that are sized to threadedly engage corresponding openings 39 formed in the electrical box mounting tabs 40. In this regard, it is preferred that the dimensions of the base plate 26 are either the same or slightly larger than the electrical box 38. In order to facilitate the flush mounting of the mounting assembly 20 on a wall 23, the base plate 26 is preferably provided with a central wire opening 42 through which wires 44, such as those which provide power to or transmit images from the camera 22, may extend. This wire opening 42 is preferably disposed in the center of the base plate 26 so that wires 44 may be easily extended from the electrical box 38 or a conduit (not shown) through the base plate 26 with the least possible interference.

In this regard, the mounting arm 27 may be considered as a housing that preferably includes a hollow channel formed by the interconnection of the arm sidewalls 45a, 45b with a top sidewall 46. The mounting arm 27 may also include one or more stiffeners, in the form of ribs 47, located in its hollow interior that further interconnect the top and sidewalls 45a–b, 46 of the mounting arm 27 together. These ribs 47 are of reduced height as compared to the sidewalls 45a–b of the mounting arm 27 so as not to interfere with the wires 44 as explained below.

The mounting arm 27 further includes a wire opening 48 disposed in its top sidewall 46 and aligned with the base plate wire opening 42. The two wire openings 42, 48 and the hollow interior of the mounting arm 27 cooperatively form a wire pathway P, through which power and transmission wires 44 may extend along and into connection with the camera 22 without interfering with the flush mounting of the assembly 20 to the wall 23. By passing the wires 44 directly through the base plate 26, the undesirable practice of passing wires 44 under an edge 28 of the base plate 26 is eliminated.

Figure 3:
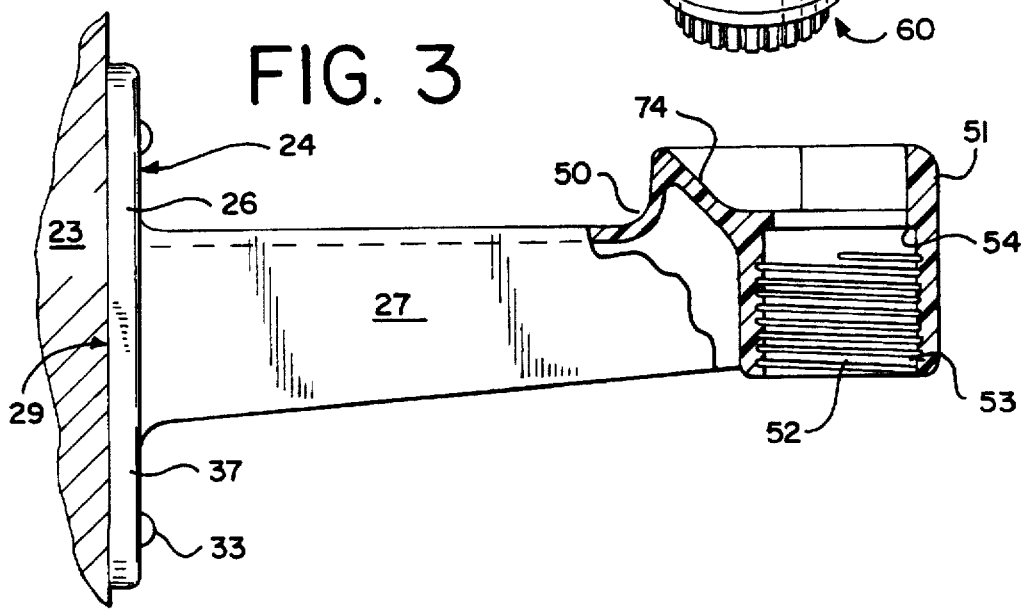
FIG. 3 is side elevational, partly in section, of the mounting arm of the mounting assembly of the present invention.
Figure 4:
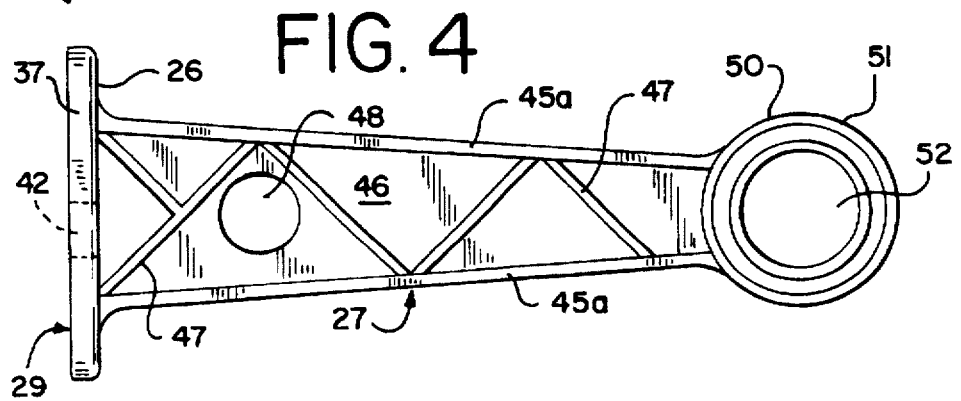
FIG. 4 is a plan view of the bottom of the mounting arm of FIG. 3 taken along lines 4—4 thereof.

At the free end 50 of the mounting arm 27, the present invention includes a camera swivel assembly 28 to which the camera 22 is mounted. The free end 50 of the mounting arm housing 27 terminates in a ring 51 having a cylindrical bore 52 as shown best in FIGS. 3 & 4. This bore 52 extends vertically through the free end 50 and is threaded at 53 on its interior wall. The threads 53 extend to just beneath an interior shoulder portion 54 formed in the bore 52. The bore 52 is dimensioned to receive a swivel in the form of a hollow socket 56 that has a somewhat cylindrical shape with an outer diameter $D_1$ that is just slightly less than the inner diameter $D_2$ of the bore shoulder portion 54 so that the socket 56 is able to rotate within the bore 52.

The socket 56 at its base includes a radial flange 57 which engages the bore shoulder 54 so as to retain the socket 56 in place with the bore 52. (FIG. 6.) The socket 56 is further retained in place within the bore 52 by a retention means, such as the retention or locking screw 60 illustrated. The locking screw 60 has a threaded outer body 62 that fits within the bore 52 and engages the threads 53 thereof. The retention screw 60 further has an elongated center post 63 that extends within and past its outer body 62. The center post 63 is received within the interior 58 of the socket 56, so that it may contact and apply a frictional retention or locking force to a camera screw 66. In this regard, and in order to facilitate the adjustment of the camera 22 on the mounting apparatus 20, the locking screw 60 may be provided with an external grip portion 64 that a user may grip to turn the locking screw 60 either clockwise or counter-clockwise to tighten or loosen its contact with the camera screw 66 as explained below.

The camera screw 66 includes a threaded screw inset 67 that is adapted to engage a threaded opening (not shown) on the camera 22. The insert 67 is disposed centrally within a mounting flange 68 of the retention screw 66. The retention screw 66 has a shaft 69 that interconnects the flange 68 to a ball end 70. The screw ball end 70 is preferably spherical in shape and fits within a complimentary-shaped cup or depression of the screw center post 63. When the locking screw 60 is turned to advance it in the threaded bore 53, it rises into frictional contact with the ball end 70. When sufficiently tightened, locking screw 60 will exert an axial pressure on the ball end 70 and press it against the interior walls 59 of the socket 56, thereby fixing the position of the camera screw 66 (and the camera 22 mounted thereto) relative to the mounting arm 27. The threaded body 62 of the locking screw 60 may also have a length such that its end 64 may be advanced into contact with the bottom of the socket radial flange 57 so as to provide an adjustable frictional force against the socket 56 to fix the socket 56 in its position relative to the mounting arm 27 and prevent it from rotation within the bore 52.

It will be understood that the socket 56 is capable of rotation within the bore 52 which rotation permits the adjustment of the pan (or horizontal) position of the camera 22. This rotation encompasses a full 360°. In order to provide movement in the tilt (or vertical) position of the camera 22, the socket 56 may be provided with an opening 72 through which the camera screw shaft 69 passes not only to permit angular displacement of the camera screw 66 from between 0° and 90°, but also to facilitate the assembly and installation of the mounting apparatus 20. This socket opening 72 extends from the top of the socket 56 down to a larger opening that defines an entrance 73 (FIGS. 1 & 5) of the socket 56 through which the camera screw end ball 70 may be inserted from the top of the mounting arm 27 while the locking screw 60 is in place within the mounting arm bore 52. The free end 50 of the mounting arm housing includes a hemispherical ramp 74 that accommodates the camera screw end ball and which further leads to the socket ball entrance 73 to accommodate the insertion and removal of the camera screw 66 from the socket 56.

With this structure, the mounting arm 27 may be easily attached to any wall or ceiling by way of either conventional wall mounting screws 33. The angle of the camera screw 66 as well as the orientation of the socket 56 can be adjusted by loosening and then tightening the locking screw 60. Thus, the camera tilt and pan positions may be adjusted in one operation. The camera screw 66 may also beneficially be removed from the apparatus 20 for attachment to the camera 22, then reattached through the socket entrance 73 and locked into position at a desired angle by tightening the locking screw 60.

The ball end 70 and socket 56 cooperatively provide the apparatus 20 with a wide range of pan and tilt positions. The components of the apparatus 20 are preferably injection molded from an electrically insulative material, such as nylon or the like for durability, strength and the prevention of ground loop interference.

While the preferred embodiment of the invention has been shown and described, it will be apparent to those skilled in the art that changes and modifications may be made therein without departing from the spirit of the invention, the scope of which is defined by the appended claims.

I claim:

1. An apparatus for mounting a camera to a mounting surface comprising: a base for mounting to the mounting surface, a mounting arm cantilevered outwardly from the base, the mounting arm having a free end, and a swivel assembly disposed at said mounting arm free end portion, the swivel assembly including a socket member capable of rotation in a horizontal plane at said mounting arm free end, a camera mounting member including a ball end received within said socket member and capable of movement in a vertical plane therein, said swivel assembly further including means for adjustably locking said camera mounting member in a preselected position relative to said mounting arm.

2. The camera mounting apparatus of claim 1, wherein said apparatus base includes a base plate and means for directly attaching said base plate to an electrical box disposed in said mounting surface.

3. The camera mounting apparatus of claim 2, wherein said base plate includes a first wire opening disposed therein and said mounting arm includes an elongated housing and a second wire opening disposed in a surface thereof, said first and second wire openings and said mounting an housing cooperatively defining a wire pathway extending for accommodating wires extending between said camera and said electrical box.

4. The camera mounting apparatus of claim 1, wherein camera mounting member includes a screw end for engaging said camera and a shaft interconnecting the camera mounting member screw and said camera mounting member ball end together, said socket member including a slot formed therein that receives said camera mounting member shaft, said slot being formed in said socket member so as to permit movement of said camera mounting member in a vertical plane in a range of between about 0° to about 90°.

5. The camera mounting apparatus of claim 4, wherein said socket member slot includes an elongated opening portion through which said camera mounting member ball end may be inserted into and withdrawn from said socket member.

6. The camera mounting apparatus of claim 1, wherein said socket member includes an outwardly extending flange and said mounting arm free end includes a interior bore, said socket member being received by said bore and rotatable therein, said bore including an annular shoulder that engages said socket member flange and partially retains said socket member within said bore.

7. The camera mounting apparatus of claim 6, wherein said bore includes a threaded portion and said adjustable locking means includes a retention screw threadedly engaging said bore.

8. The camera mounting apparatus of claim 7, wherein said retention screw includes an outer body portion and an elongated center post portion, the outer body being threaded and said center post portion including a contact face that is complimentary in configuration to said camera mounting member ball end.

9. The camera mounting apparatus of claim 1, wherein said mounting arm free end includes an axial bore and said socket member is received within said bore, said selectively adjustable locking means including a locking screw engaging said bore, the locking screw having a contact face disposed in opposition to said camera mounting member ball end and selectively engageable therewith, the contact face applying a locking pressure upon turning of said locking screw.

10. The camera mounting apparatus of claim 1, wherein said camera mounting member includes a body portion and a screw end for engaging said camera disposed at one end of said body portion, said ball end being disposed at an opposite end of said body portion, said socket member including a slot formed therein, the socket member slot movably receiving said camera mounting member body portion therein, said socket member slot including an enlarged portion defining an entrance to said socket member for insertion and withdrawal of said camera mounting member ball end.

11. The camera mounting apparatus of claim 10, wherein said mounting are free end includes a ramp portion formed therein, said ramp permitting said camera mounting member to be inserted or withdrawn from said socket member.

12. A support apparatus for a security camera comprising:

a base for mounting the apparatus on a mounting surface, an elongated mounting arm extending in a cantilevered fashion outwardly from the base, the mounting arm having a camera support end, and a camera mounting assembly movably mounted to the mounting arm camera support end, the camera mounting assembly including a socket member mounted on said mounting arm camera support end for rotation in a horizontal plane and a camera mounting member mounted in the socket member for movement in a vertical plane, said support apparatus further including selectively adjustable means for applying a locking force to either said socket member or said camera mounting member to fix the position thereof with respect to said mounting arm.

13. The support apparatus as defined in claim 12, wherein said mounting arm camera support end includes a socket member being received within the passage, said passage having an interior shoulder that limits movement of socket member in said passage in one direction, said selectively adjustable locking means limiting movement of said socket member in said passage in another direction.

14. The support apparatus as defined in claim 12, wherein said mounting arm camera support end includes a cylindrical bore that receives said socket member therein, said camera mounting member being aligned with said bore and having an engagement member extending therefrom, said camera mounting member further having a ball member within said socket member, said selectively adjustable locking mens including a locking screw that engages said bore, the locking screw having a first contact surface that may be selectively moved into and out of contact with said camera mounting member ball member to adjust its position within said socket member.

15. The support apparatus as defined in claim 14, wherein said locking screw includes a second contact surface that may be selectively moved into and out of contact with said socket member to adjust its position within said bore.

16. The support apparatus as defined in claim 12, wherein said mounting arm includes a hollow, elongated housing and said base includes means for attaching said base directly to an electrical box, said base including a first wire opening disposed therein defining a passage between said electrical box and the interior of said mounting arm housing to accommodate wires from said electrical box into said mounting arm housing, said mounting arm housing including a second wire opening disposed therein defining a passage between said mounting arm housing and a camera mounted to said support apparatus to accommodate said wires out of said mounting arm housing to said camera.

17. The support apparatus as defined in claim 15, wherein said locking screw includes a center shaft and said second contact surface is disposed on an end of said shaft, said second contact surface including a generally circular depression.

18. The support apparatus as defined in claim 12, wherein said socket member includes a slot formed therein through which said camera mounting member passes, said slot including an enlarged portion defining a passage of said socket member through which said camera mounting member may be inserted into and withdrawn from said socket member.

19. The support apparatus as defined in claim 18, wherein sid mounting arm camera support end includes an entrance ramp leading to said socket member slot enlarged portion that accommodates the insertion into and removed from said camera mounting member from said socket member.

20. The support apparatus as defined in claim 13, wherein said adjustable locking means includes a locking screw that threadedly engages said passage, the locking screw having a camera mounting member engagement shaft that extends into said socket member and applies a selectively adjustable locking force to said camera mounting member.

21. A camera mounting apparatus for adjustably mounting a camera to a planar surface, comprising, a base for attachment to the surface, an arm extending out from the base, the arm having a free end, the free end having a bore, the bore containing a socket therein capable of rotation with said bore, the socket containing a camera mounting lug for mounting said camera to said arm free end, the camera mounting lug including a ball member, a camera screw and a shaft extending between and interconnecting said ball member and camera screw, said socket including a slot, said socket engaging said camera mounting lug so that said ball member is held in alignment with said bore, said shaft projects through said socket slot and said camera screw is positioned exterior of said socket and said apparatus further including a selectively adjustable locking member for fixing the position of said camera screw and a camera attached thereto with respect to said arm, the locking member being received within said bore in opposition to said ball member and selectively movable into and out of functional engagement with said ball member to selectively fix said ball member in a selected position within said socket.

* * * * *